Sept. 27, 1960 K. L. KREBS 2,954,130
LIFT CONVEYOR FOR UPSETTING MACHINE
Filed July 8, 1959 2 Sheets-Sheet 1
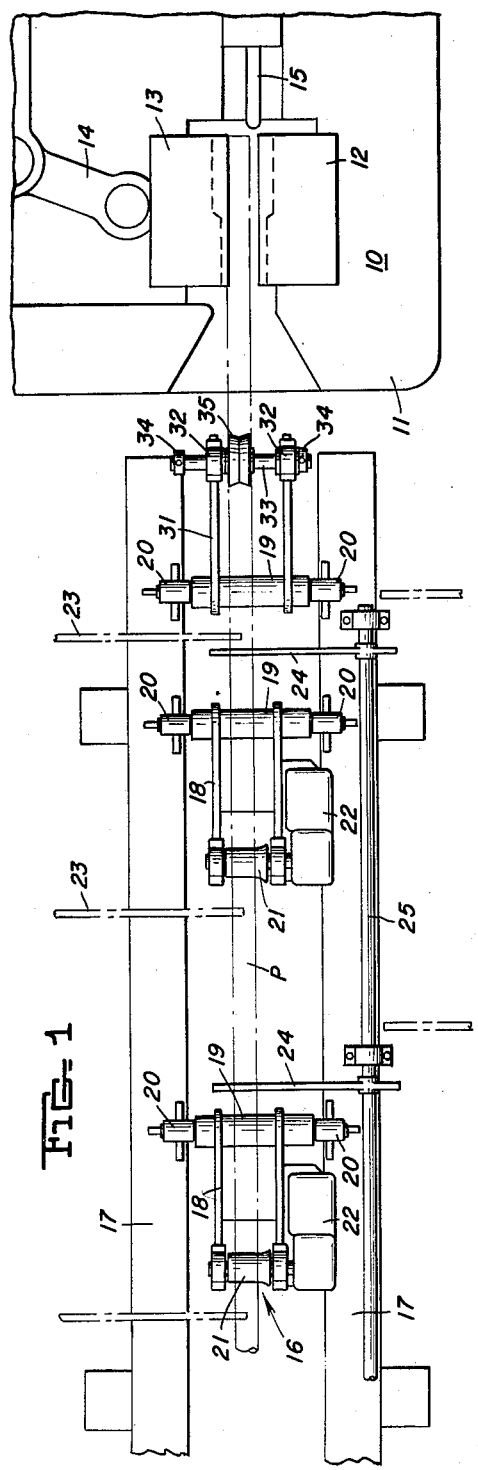
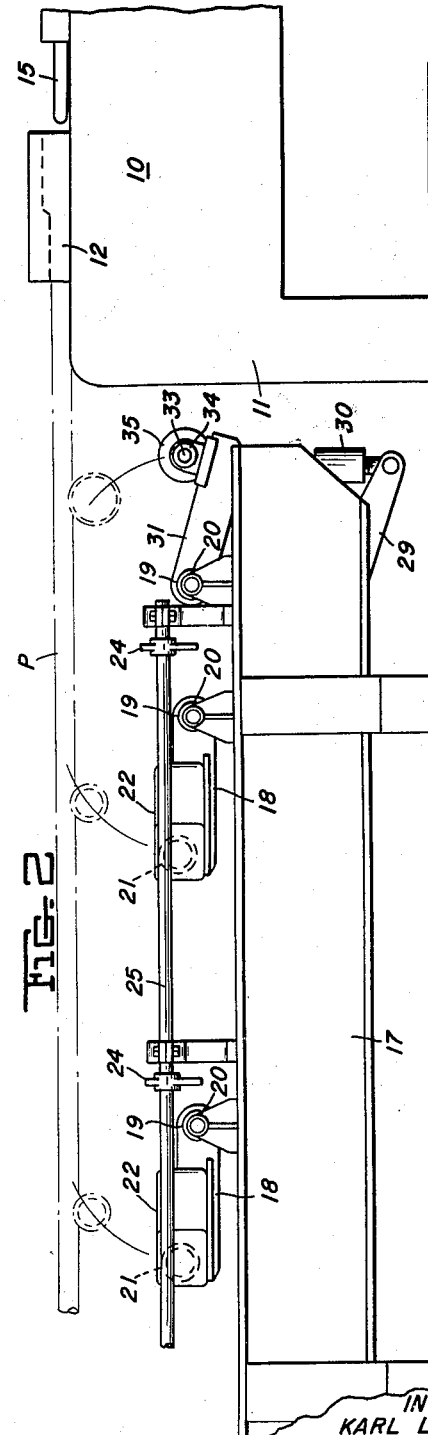
INVENTOR
KARL L. KREBS
By Donald G. Dalton
Attorney Sept. 27, 1960 K. L. KREBS 2,954,130
LIFT CONVEYOR FOR UPSETTING MACHINE
Filed July 8, 1959 2 Sheets-Sheet 2
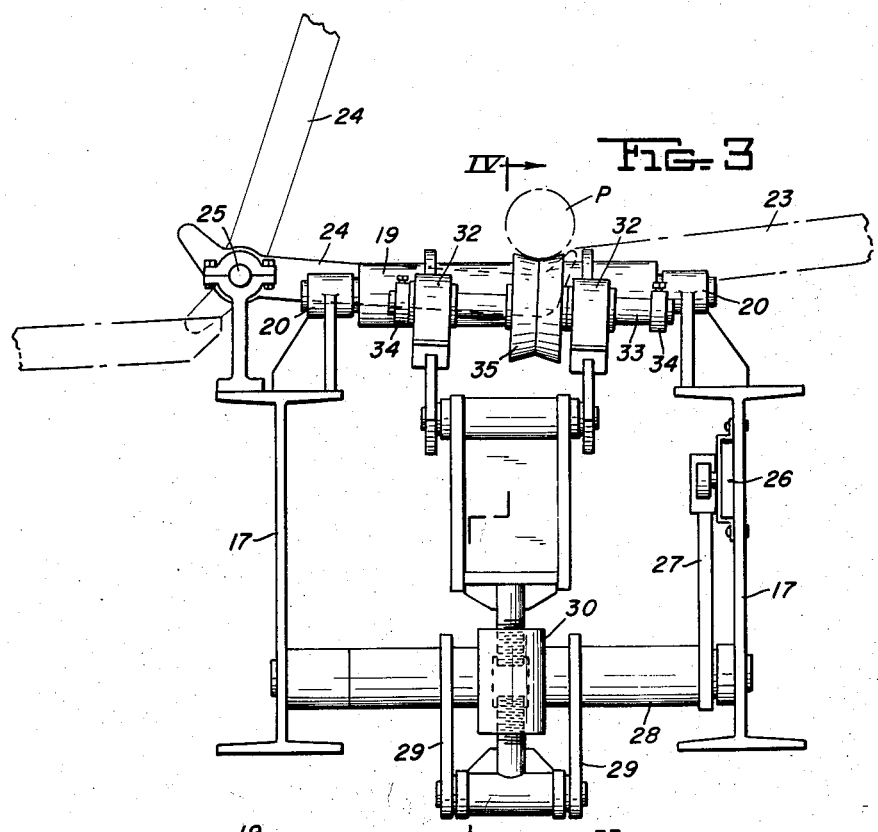
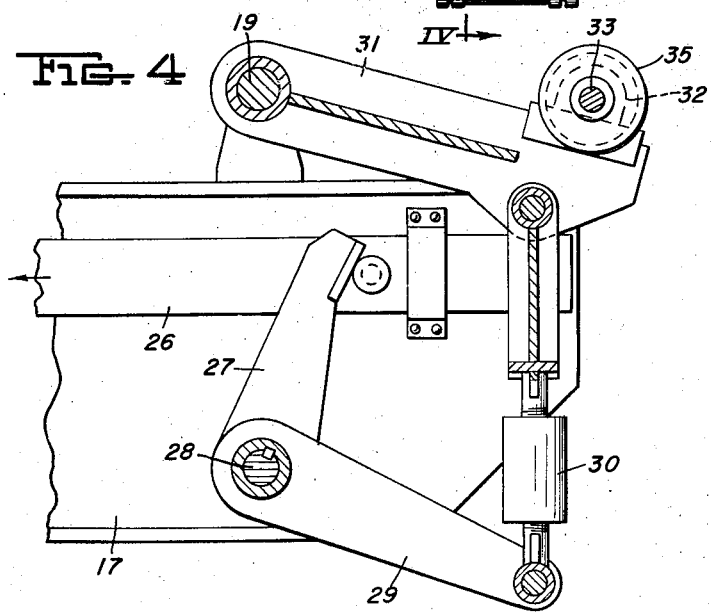
INVENTOR
KARL L. KREBS
By Donald G. Dalton
Attorney

United States Patent Office 2,954,130
Patented Sept. 27, 1960

2,954,130

LIFT CONVEYOR FOR UPSETTING MACHINE

Karl L. Krebs, Ellwood City, Pa., assignor to United States Steel Corporation, a corporation of New Jersey Filed July 8, 1959, Ser. No. 825,837

4 Claims. (Cl. 214—1)

This invention relates to a conveyor for handling pipe lengths or similar articles into and out of a forging machine for upsetting an end thereof in a plurality of steps.

For certain uses, it is desirable to upset pipe lengths at one end. This is usually done in a forging machine having coacting dies, one fixed and one movable, to receive the end of a length after it has been heated to forging temperature, and a reciprocating punch effective to upset the pipe end while confined within the closed dies. It is customary to provide the machine with a plurality of sets of dies in vertically spaced relation so the upsetting may be effected in several steps at one heat. A lift conveyor having power-driven rollers journaled in tilting frames is employed to move the lengths into and out of the several sets of dies. In operation, the tilting of the frames between upsetting strokes serves to bring the length on the rollers into proper alinement with the particular set of dies to be used in the succeeding stroke.

Since the dies are in two parts, fins of flash are usually formed by the upsetting pressure, by extrusion into the joints between die halves. If the pipe length turns between upsetting strokes, the fins formed on one stroke will be crushed down by the dies when closed for the next stroke. The resulting laps cannot be removed satisfactorily or without excessive labor cost and cannot be left in the pipe lengths because they are an obvious defect. I have invented an improved conveyor for handling pipe lengths to and from a forging machine for upsetting the ends thereof, which incorporates means preventing rotation of a length between successive upsetting strokes, despite the lateral movement of the length incident to opening and closing of the upsetting dies.

In the present preferred embodiment of the invention, I provide a conventional lift conveyor with an idler magnetic roller adjacent the forging machine. The roller is carried on a shaft slidable in spaced bearings and inclined upwardly from the entry to the exit side of the conveyor. The magnetic roller holds the pipe lengths against turning, even though they are skidded laterally along the driven conveyor rollers by the movement of the movable dies from and toward the fixed die. Thus the flash fins formed on the pipe length in the first step of upsetting are held in the same position from one pass to the next and are not crushed down so as to form laps. The fins remain upstanding after completion of the upsetting and may thereupon be easily removed as by a hand grinder.

A complete understanding of the invention may be obtained from the following detailed description and explanation which refer to the accompanying drawings illustrating the present preferred embodiment. In the drawings:

Figure 1 is a plan view showing a portion of the forging machine and a portion of the conveyor;

Figure 2 is an elevation corresponding to Figure 1;

Figure 3 is an elevation of the conveyor end adjacent the forging machine; and

Figure 4 is a partial section taken along the plane of line IV—IV of Figure 3.

Referring now in detail to the drawings, a forging machine 10 comprises a frame 11, a set of fixed dies 12 secured therein and a set of coacting dies 13 movable toward and from the fixed dies by means including a toggle link 14. A punch 15 is reciprocable toward and from the dies when they have been closed on the end of a pipe length supported on a conveyor 16 alined with the punch. The conveyor comprises spaced side beams 17 having roller-mounting frames 18 secured to transverse rock shafts 19 spaced therealong and journaled in bearings 20. A tapered conveyor roller 21 is journaled in the end of each frame remote from shaft 19 and a motor and gear reducer 22 for driving each roller is mounted on the frame in which it is journaled.

Entry skids 23 are spaced along one side of the conveyor for introducing pipe lengths laterally thereonto and kick-out arms 24 spaced along a rock shaft 25 on the other side are provided for removing the lengths from the conveyor on completion of the upsetting. A thrust bar 26 reciprocably mounted on one of the beams 17 actuates crank arms 27 on cross shafts 28 extending between the beams. Crank arms 29 on the latter effect tilting of frames 18 through turnbuckle links 30, to bring the rollers 21 to the proper level for entry of the end of a pipe length thereon between a particular pair of dies. The apparatus described in detail thus far is conventional. My invention relates only to the novel features to be described hereafter.

A tilting frame 31, similar to frames 18, is mounted at the forging-machine end of conveyor 16 in substantially the same manner as the latter, except that the free end is disposed toward the forging machine. As shown best in Figures 3 and 4, frame 31 has bearings 32 thereon, slidably supporting a shaft 33. Collars 34 on the ends of the shaft limit the axial movement thereon in bearings 32. A V-roller 35 is fixed on the shaft between bearings and is provided with permanent magnets whereby it attracts magnetic articles thereon strongly enough to exert a good frictional hold on them. The purpose thereof is to prevent a pipe length on the conveyor from rotating, even though it is moved laterally first in one direction and then in the other, between successive upsetting strokes.

In operation of the apparatus, frames 18 and 31 are initially disposed so that rollers 21 and 35 are in position to feed a pipe length into the first set of dies, usually the lowermost. Roller 35 by its weight causes shaft 33 to slide toward the lower bearing 32 until the latter is engaged by the roller. The dies 13 being retracted from dies 12, a pipe length is released down skids 23 and comes to rest on rollers 21. The latter are then driven to feed the end of the length over roller 35 and between the dies. A retractable stop (not shown) is usually provided to determine the proper position of the end of the length for engagement by the dies. The dies 13 then close on dies 12, and the pipe length P is thereby moved laterally across the faces of rollers 21. Roller 35 with its shaft 33 is pushed "uphill" in bearings 32. The punch 15 is then actuated for the first upsetting operation. On completion thereof, the dies 13 are retracted. The pipe length P thereupon tends to slide back across rollers 21 and moves roller 35 with it. Because of the magnetic attraction of roller 35 for the pipe length, however, rotation of the length is prevented. Thus any fins of flash resulting from the first upsetting operation are held in a vertical plane.

Frames 18 and 31 are then tilted by actuating bar 26 to bring the pipe length to the level of the next set of dies. The second upsetting step is then performed as already described, followed by the third. Since the length is held against rotation on the conveyor, the fins formed in the first step are in line with the joints between the die halves in the second and third steps. The fins are therefore left standing and are not flattened down to form laps. On completion of the last step of the upsetting operation, the length is removed from rollers 21 by operating kick-out arms 24 and rollers 21 and 35 are lowered to receive the next length. After cooling of the upset end, the fins are removed by grinding and the lengths are then ready for subsequent finishing operations.

It will be apparent that the invention provides simple yet highly effective means for preventing laps which would result from flattening of the flash fins, by holding each pipe length firmly in the same position relative to its own axis throughout the upsetting, even though repeated forth and back lateral movement is incidental thereto. The effect of magnetic roller 35 is to cause the lengths to slide across rollers 21 instead of rolling on the faces thereof.

Although I have disclosed herein the preferred embodiment of my invention, I intend to cover as well any change or modification therein which may be made without departing from the spirit and scope of the invention.

I claim:

1. In apparatus for handling elongated round members into and out of a machine for working the ends thereof, said apparatus including a roller conveyor adjacent said machine adapted to support a member and move it axially toward and from the latter, the rollers of said conveyor being shaped to permit limited lateral movement of the members incident to said working, the combination therewith of a magnetic V-roller located between said conveyor and said machine, adapted to be engaged by a member advancing to said machine, and means mounting the V-roller for limited axial movement whereby it holds the member against rotation during its lateral movement on said conveyor.

2. Apparatus as defined in claim 1, characterized by said mounting means including two spaced bearings at different elevations whereby said V-roller is journaled with its axis inclined to the horizontal.

3. Apparatus as defined in claim 1, characterized by said mounting means including two spaced bearings and a shaft slidable axially therein, said V-roller being mounted on said shaft.

4. Apparatus as defined in claim 1, characterized by said mounting means including a tiltable frame, and means for actuating said frame to position said magnetic roller selectively at various levels.

No references cited.